UNITED STATES PATENT OFFICE.

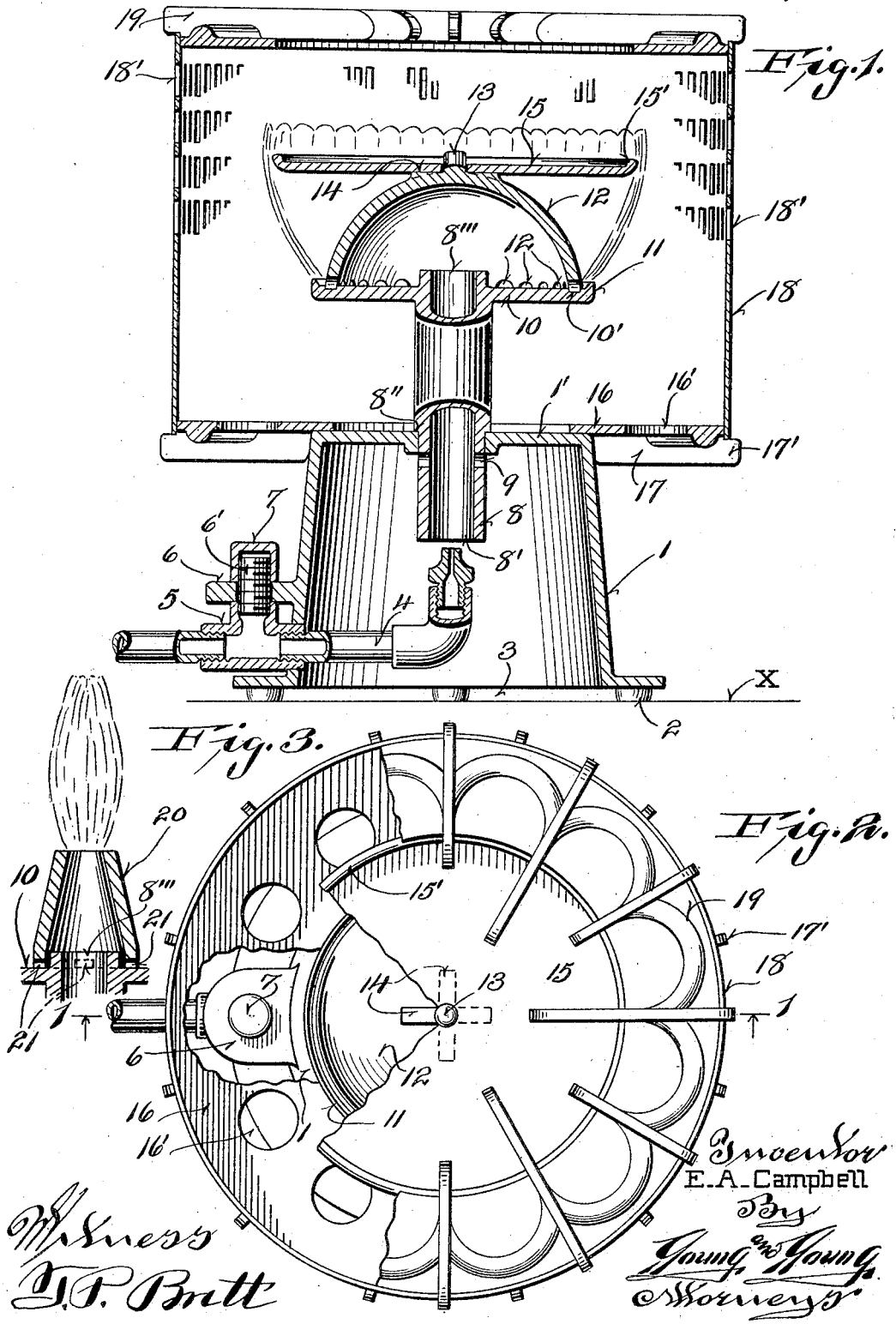

EDWARD A. CAMPBELL, OF KENOSHA, WISCONSIN.

COMBINATION GAS STOVE AND BURNER.

1,397,160.  Specification of Letters Patent.  Patented Nov. 15, 1921.

Application filed April 26, 1921. Serial No. 464,594.

*To all whom it may concern:*

Be it known that I, EDWARD A. CAMPBELL, a citizen of the United States, and resident of Kenosha, in the county of Kenosha and State of Wisconsin, have invented certain new and useful Improvements in Combination Gas Stoves and Burners; and I do hereby declare that the following is a full, clear, and exact description thereof.

My invention refers to gas burning stove units, and it has for its primary object to provide a simple, economical and effective burner for artificial or natural gas, wherein, owing to peculiarities of construction, perfect combustion is obtained as well as economy in fuel, and the maximum development of heat produced.

Other objects of my invention are:

To provide a portable, knock-down stove unit capable of being utilized for cooking, heating and also as a portable blow torch for general utilization, such as soldering, welding, fusing or any other purpose to which standard types of blowers may be applied.

To provide a burner having a gas discharge tip incased in a bell-base having an annular air intake passage about its bottom edge, and a separable collared mixing tube supported by and extending in the base, the intake mouth of which is arranged to receive gas discharge from the tip, and positioned a predetermined distance above the mouth, the tube is provided with auxiliary transversely disposed air mixing ports whereby a normal volume of air and gas are first mixed as they travel through the tube, followed by the introduction of an auxiliary volume of air through the ports, which auxiliary volume co-mingles with the main volume, and thus insures a uniform strata of gas at the discharge, the annular air intake passage at the lower edge of the bell-base causing a flow in all directions toward the center thereof to thus eliminate puffed air currents.

To provide a corrugated edge, spherical, separable gas storage and superheating dome associated and supported by the mixing tube collar, the collar having an annular beveled discharge bead forming, in conjunction with the corrugated dome edge, a gas ignition mouth, whereby storage of ample capacity is afforded for the gas supply above its point of discharge, which storage supply is heated to thus insure uniform feed of gas through the ignition mouth and to deflect such discharge upwardly for maintaining a uniform circular flame about the dome.

To provide a heat absorbing and flame deflecting disk, which is detachably supported upon the dome whereby the flame is uniformly spread and the disk heated to serve as a heat collecting and radiating medium.

To provide a removable incasing drum for the burner, having a series of air vents about its upper edge to prevent overheating of the parts, the drum being supported by a ported skeleton frame that in turn rests upon the upper face of the bell-base, the upper edge of the drum being adapted to receive a grid plate, this structure, as a whole, serving to protect the flame against cross-currents of air, and also to permit air to freely pass from the bottom of the drum upwardly and to be discharged through the vents thereof, whereby a wall of air is developed about the central burner to insure a clean flame, and perfect combustion resulting in elimination of carbon deposits.

To provide the heat absorbing and deflecting disk with an annular reinforcing bead whereby strength is added to the disk, while at the same time the bead serves as a reinforcement to prevent warping under extreme heat conditions.

To provide a gas nipple in axial alinement with the air receiving and mixing tube, having a tapered choke-bore discharge channel to insure a compact steady stream of gas upon the injector principle, whereby air is drawn from the interior of the dome into the mouth of the tube uniformly.

To provide a simple and economical means for attaching the gas supply pipe to the bell-base.

To provide means integral with the upper wall of the base dome for the support of the deflecting and heat absorbing disk.

With the above and other minor objects in view, the invention consists in certain peculiarities of construction and combination of parts, as are hereinafter set forth with reference to the accompanying drawings and subsequently claimed.

In the drawings:

Figure 1 represents a longitudinal sectional elevation of a portable, knock-down stove and burner embodying the features of my invention, the section being indicated by line 1—1 of Fig. 2.

Fig. 2 is a plan view of the same with parts broken away to more clearly illustrate other parts upon a lower plane, and, Fig. 3 is a detail sectional elevation of a conical torch extension nipple fitted to the discharge mouth of a mixing tube constituting part of the burner, said attachment being positioned when the burner is utilized as a blower torch.

Referring by characters to the drawings, 1 represents a hollow bell-base open at its bottom and outwardly flanged, the flanges being formed with downwardly extended buttons 2, whereby said flanged bottom edge is maintained a predetermined distance from the surface $x$ upon which the bell-base rests, the space forming an annular air passage 3. The base wall is also provided with an aperture through which extends a gas supply pipe 4, the same being interrupted by a T-coupling 5, which is positioned exteriorly of the bell-base, and the upper neck of the coupling is adapted to engage an apertured ear 6, which projects from the side wall of said base.

The upper neck of the T-coupling has threaded therein a thimble 6', which extends through the ear 6 and is in threaded union with a cap 7 whereby the feed pipe is securely anchored in its proper position with relation to the base. The top wall 1' of the bell-base is formed with a central aperture through which is removably fitted a mixing tube 8, the intake mouth 8' of which is maintained a predetermined distance from the bottom of the base by a shoulder 8'', which engages the upper face of the top wall 1'. The lower end of the mixing tube, which is incased within the bell-base, is formed with transverse auxiliary air ports 9 and the upwardly projecting portion of the mixing tube is formed with an integral collar 10, which collar is positioned just below the discharge mouth 8''' of said tube. The collar is formed near its peripheral edge with an annular groove 10', and said collar terminates with an upstanding flange 11 having an inner beveled wall which serves as a deflecting surface, constituting one element of a gas ignition mouth. A semi-spherical detachable dome 12 having its lower edge formed with a series of corrugations 12' is mounted upon the collar 10, the projecting edges of the dome corrugations being adapted to set within the collar groove 10', whereby a practical tight joint is effected between these parts, to prevent lateral displacement of the dome. The corrugations 12', in conjunction with the collar flange 11, complete the gas ignition discharge mouth, and owing to the fact that the flange 11 is provided with a flaringly tapered inner wall, the annular gas jet discharged from the mouth will be deflected outwardly, so as to facilitate spreading the flame in a thin sheet, and thereby increase its efficiency.

Projecting from the central portion of the dome is an anchor pin 13, and radiating from the pin are a series of horizontal surfaced beaded ribs 14. These ribs are adapted to serve as supports for a heat absorbing and deflecting disk 15, which disk is provided with a central aperture for anchor engagement with the pin 13, whereby the disk is held against lateral play, while the beads, upon which it is supported, serve to maintain it in a true horizontal position with relation to the dome ignition mouth. The edge of the heating and deflecting disk 15 is formed with an upturned annular bead 15', whereby the disk is reinforced and warping thereof, due to expansion and contraction, is avoided.

In order to provide a suitable supporting means for cooking vessels, and also means for preventing cross-currents of air through the flame, I provide a bottom ring 16, which ring is adapted to rest upon the upper face of the bell-base wall 1', the ring being formed with a series of air intake ports 16', which ports are positioned beyond the outer walls of said bell-base. The ring is reinforced by a series of downwardly extended ribs 17, the inner edges of which abut the juxtaposed walls of the bell-base, and thus serve to center said ring, while the outer ends 17' of the ribs serve as a series of supports for a burner incasing drum 18, the lower edge of which drum rests upon the rib ends 17' and snugly fits against the annular edge of the ring proper. Thus a rigid and non-tipping support for the drum is had in connection with the bell-base 1, the parts thereof being loosely mounted, whereby they may be separately removed or quickly assembled by the ordinary user of a stove.

The upper portion of the drum 18 is formed with a plurality of rows of perforations 18', and the upper edge of the drum serves as a support for a ribbed grid 19, which is fitted thereto and adapted to receive cooking utensils or the like, the height of the drum being such that the grid is supported at the proper distance from the upper edge of the flame, whereby the bottom of the utensil is subjected to the maximum heat. Owing to the fact that the bottom ring 16 is provided with a series of air intake ports and that the upper portion of the drum walls are perforated, it will be seen that air is permitted to enter the body of the drum through the ports 16', and will thus travel upwardly and about the flame and be discharged through the perforations, so as to prevent overheating of the drum.

This air also serves as a wall to prevent cross-currents interfering or deflecting the circular flame.

It will be further noted that this air supplies the proper amount of oxygen always at the point of consumption of the gas, and that as the air travels past the flame, it will be heated more or less so that when the stove is utilized for a heater only, this air, which constantly travels through the drum, will materially add to the hot air circulation.

When it is desired to utilize the burner as a blower torch, the drum and its associated parts are removed, together with the spherical dome and heat retaining and deflecting disk 15. The discharge mouth 8''' has then fitted thereover a torch extension nipple 20 as shown in Fig. 3, which nipple is conical in shape and slightly contracted at its discharge mouth, whereby the mixing tube is extended in length to develop a single, compact and intense torch flame, which flame can be used for all the purposes to which the ordinary burner torches are applied. Obviously, it will be noted that when the device is then used as a burning torch for any purpose, if it is desired for removing paint or the like, a flexible tube can be attached to the feed pipe 4, whereby the device, as a whole, can be manipulated back and forth to operate conveniently upon the surface from which the paint is to be removed.

When it is desired to utilize the stove as a heating unit only, a grid 19 may or may not be removed, and the heat absorbed by the metal parts, especially the disk 15, will thus radiate in sufficient quantities to warm up a room of ordinary dimensions, without the aid of other heating apparatus.

It will be further noted that when the device is packed for shipment, all the parts can be dismounted and nested in a close mass, whereby bulk is reduced to a minimum and the parts of the device are not liable to become damaged, as would be the case if they were shipped, assembled and secured together.

Obviously, a further important feature of this demountable structure is that all of the parts can be separated and cleaned.

As shown in Fig. 3, the torch extension nipple at its base is formed with rectangular notches or air intake openings 21, whereby an additional air supply can enter the tube at this point to further increase the efficiency of the combustible gases.

I claim:

1. A gas burning stove unit comprising a bell-base, having its lower edge offset to form an annular air supply passage, an open ended mixing tube extending into the base having auxiliary air ports therein about its lower open end and within the base, a gas discharge nipple associated with the lower end of the mixing tube, a collar extending from the upper end of the mixing tube, a removable dome fitted to the collar having a corrugated edge forming an ignition mouth in connection with the collar, a deflected disk mounted upon the dome, and a drum supported by the base incasing the dome, the drum being provided with an air inlet open at its bottom and a series of vent apertures at its top portion.

2. A gas burning stove unit comprising a bell-base, having its lower edge offset to form an annular air supply passage, an open ended mixing tube extending into the base having auxiliary air ports therein about its lower open end and within the base, a gas discharge nipple associated with the lower end of the mixing tube, a collar extending from the upper end of the mixing tube, the collar being adapted to selectively support a gas mixing dome having corrugated lower edges forming a firing mouth or a conical extension nipple, whereby the tube may be converted from a circular gas burning flame to a torch flame.

3. A gas burning stove unit comprising a bell-base, having its lower edge offset to form an annular air supply passage, and its top wall apertured, a feed pipe secured to and extending into the base having a gas discharge nipple concentric with the top wall aperture of the base, a mixing tube extending through the base aperture having its intake mouth near the gas discharge tip, and auxiliary air ports above said mouth, the tube being provided with a supporting shoulder engageable with the top wall of the aforesaid base.

4. A gas burning stove unit comprising a bell-base, having its lower edge offset to form an annular air supply passage, and its top wall apertured, a feed pipe secured to and extending into the base having a gas discharge nipple concentric with the top wall aperture of the base, a mixing tube extending through the base aperture having its intake mouth near the gas discharge tip, auxiliary air ports above said mouth, the tube being provided with a supporting shoulder engageable with the top wall of the aforesaid base, a collar extending from the tube near its discharge and having a groove therein, the collar terminating with an annular flange, a separable semi-spherical dome having its lower edge corrugated and nested within the collar groove, and a demountable deflector and heating disk fitted upon the dome.

5. A gas burning stove unit comprising a bell-base, having its lower edge offset to form an annular air supply passage, and its top wall apertured, a feed pipe secured to and extending into the base having a gas discharge nipple concentric with the top wall aperture of the base, a mixing tube extending through the base aperture having its intake mouth near the gas discharge tip, auxiliary air ports, above said mouth, the tube being provided with a supporting shoulder engageable with the top wall of the aforesaid base, a collar extending from the tube near its discharge and having a groove therein, the collar terminating with an annular flange, a separable semi-spherical dome having its lower edge corrugated and nested within the collar groove, a demountable deflector and heating disk fitted upon the dome, a removable ported ring supported by the bell-base, a separable drum mounted upon the ring for incasing the dome and having its upper edge provided with series of vent apertures, and a grid fitted to the upper edge of the drum.

6. A gas burning stove unit comprising a hollow base having an air passage about its lower edge, a mixing tube extending to the base, having its intake mouth positioned above a gas discharge nipple, the tube being provided with transverse auxiliary air ports communicating with the base cavity, a collar extending from the upper edge of the mixing tube near its discharge mouth, the collar being provided with an annular groove and terminating with an upstanding flange having an inner beveled face, a semi-spherical dome having its lower edge corrugated and nested within the collar groove, the corrugations in conjunction with the collar forming a series of ignition mouths, whereby the gas discharged therefrom is deflected upwardly by the beveled edge of the collar flange, a heating and deflecting disk mounted upon the dome, the diameter of said disk being greater than that of the collar, and a drum incasing the dome and associated parts, the drum having air intake ports at its lower end and vent apertures about the walls thereof at its upper end, the vent apertures terminating above the plane of the ignition mouths.

In testimony that I claim the foregoing I have hereunto set my hand at Kenosha, in the county of Kenosha and State of Wisconsin.

EDWARD A. CAMPBELL.